United States Patent
Snyder et al.

(10) Patent No.: US 10,696,210 B2
(45) Date of Patent: Jun. 30, 2020

(54) LOW LUMINANCE LIGHTING

(71) Applicant: RENSSELAER POLYTECHNIC INSTITUTE, Troy, NY (US)

(72) Inventors: Jeremy David Snyder, Delmar, NY (US); John Donovan Bullough, Troy, NY (US); Ute Christa Besenecker, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 162 days.

(21) Appl. No.: 14/652,208

(22) PCT Filed: Feb. 24, 2014

(86) PCT No.: PCT/US2014/018051
§ 371 (c)(1),
(2) Date: Jun. 15, 2015

(87) PCT Pub. No.: WO2014/130957
PCT Pub. Date: Aug. 28, 2014

(65) Prior Publication Data
US 2015/0330588 A1  Nov. 19, 2015

Related U.S. Application Data

(60) Provisional application No. 61/768,684, filed on Feb. 25, 2013.

(51) Int. Cl.
*B60Q 1/14* (2006.01)
*F21V 5/04* (2006.01)
(Continued)

(52) U.S. Cl.
CPC .......... *B60Q 1/143* (2013.01); *F21S 41/143* (2018.01); *F21S 41/285* (2018.01); *F21S 41/322* (2018.01);
(Continued)

(58) Field of Classification Search
USPC .................................................. 362/549–522
See application file for complete search history.

(56) References Cited

U.S. PATENT DOCUMENTS

| 6,986,593 B2 | 1/2006 | Rhoads et al. |
| 2006/0158896 A1* | 7/2006 | Krupa .................... A61B 1/07 362/555 |

(Continued)

FOREIGN PATENT DOCUMENTS

| EP | 1600689 | 11/2005 |
| EP | 2827193 A1 | 1/2015 |

(Continued)

OTHER PUBLICATIONS

European Search Report dated Jan. 5, 2017 in European Patent Application No. 14753904.3.

(Continued)

*Primary Examiner* — Matthew Mikels
(74) *Attorney, Agent, or Firm* — Murtha Cullina LLP

(57) ABSTRACT

Novel and advantageous lighting modules and systems are provided. Lighting modules and systems according to embodiments of the subject invention can be low-luminance, high-efficiency, low-glare lighting modules. For example, a lighting system can utilize multiple layers of efficient optics to spread light from multiple light sources (e.g., a grid of point sources) over a larger luminous surface. The larger luminous surface can maintain the controllability, directionality, and efficiency of a single point source, while significantly reducing the glare. The surface can appear uniformly lit, or substantially uniformly lit, and no dark boundaries may be present between the individual light sources.

18 Claims, 6 Drawing Sheets

(51) Int. Cl.
| | |
|---|---|
| *F21V 5/00* | (2018.01) |
| *F21S 41/20* | (2018.01) |
| *F21S 41/32* | (2018.01) |
| *F21S 41/143* | (2018.01) |
| *F21S 8/08* | (2006.01) |
| *F21V 29/74* | (2015.01) |
| *B60Q 1/00* | (2006.01) |
| *F21V 23/04* | (2006.01) |
| *F21V 7/00* | (2006.01) |
| *F21V 13/04* | (2006.01) |
| *F21Y 115/10* | (2016.01) |
| *F21Y 105/10* | (2016.01) |
| *F21S 45/47* | (2018.01) |

(52) U.S. Cl.
CPC .............. *F21V 5/007* (2013.01); *F21V 5/008* (2013.01); *F21V 5/045* (2013.01); *B60Q 1/0035* (2013.01); *F21S 8/085* (2013.01); *F21S 45/47* (2018.01); *F21V 7/0083* (2013.01); *F21V 13/04* (2013.01); *F21V 23/0457* (2013.01); *F21V 29/74* (2015.01); *F21Y 2105/10* (2016.08); *F21Y 2115/10* (2016.08)

(56) References Cited

U.S. PATENT DOCUMENTS

| | | | |
|---|---|---|---|
| 2007/0008734 | A1 | 1/2007 | Bogner et al. |
| 2008/0043466 | A1 | 2/2008 | Chakmakjian et al. |
| 2010/0130687 | A1 | 5/2010 | Tu et al. |
| 2010/0165623 | A1 | 7/2010 | Bremerich et al. |
| 2011/0058370 | A1* | 3/2011 | Datz ................... B60Q 1/2611 362/235 |
| 2011/0198619 | A1* | 8/2011 | Chiang ............... H01L 25/0753 257/88 |
| 2011/0216522 | A1* | 9/2011 | Harbers ................ F21K 9/50 362/84 |
| 2011/0291564 | A1* | 12/2011 | Huang ............... F21V 23/0457 315/77 |
| 2012/0020092 | A1* | 1/2012 | Bailey ................... F21K 9/232 362/311.02 |
| 2012/0275174 | A1 | 11/2012 | Takahashi et al. |
| 2012/0294024 | A1* | 11/2012 | Peck .................. F21S 48/1159 362/516 |
| 2012/0294025 | A1* | 11/2012 | Kim ...................... H01L 33/46 362/516 |
| 2014/0193116 | A1* | 7/2014 | Bylander ............. G02B 6/4214 385/33 |

FOREIGN PATENT DOCUMENTS

| | | |
|---|---|---|
| JP | 2002-094129 | 3/2002 |
| WO | 0112700 A1 | 2/2001 |
| WO | 01059360 A1 | 8/2001 |
| WO | 2010094141 A1 | 8/2010 |
| WO | 2010103477 A1 | 9/2010 |
| WO | 2013132260 A2 | 9/2013 |

OTHER PUBLICATIONS

Chang et al., "Edge-selectively functionalized graphene nanoplatelets," The Chemical Record, Apr. 9, 2013, pp. 224-238, vol. 13, No. 2.
Kim et al., "Edge-functionalized graphene-like platelets as a co-curing agent and a nanoscale additive to epoxy resin," Journal of Materials Chemistry, 2011, pp. 7337-7342, vol. 21, No. 20.
Liu et al., "Edge-functionalized graphene as reinforcement of epoxy-based conductive composite for electrical interconnects," Composites Science and Technology, Sep. 7, 2013, pp. 84-91, vol. 88.
Sudeep et al., "Covalently interconnected three-dimensional graphene oxide solids," ACS Nano, Aug. 2013, pp. 7034-7040, vol. 7, No. 8.
Wan et al., "Ultrafast fabrication of covalently cross-linked multi-functional graphene oxide monoliths," Advanced Functional Materials, Aug. 20, 2014, pp. 4915-4921, vol. 24, No. 31.
International Search Report and Written Opinion, PCT International Application No. PCT/US2014/018051, dated Jul. 24, 2014, PCT/ISA/210, PCT/ISA/220, PCT/ISA/237.

* cited by examiner

LOW LUMINANCE LIGHTING

CROSS-REFERENCE TO RELATED APPLICATIONS

This application is a national stage application of International Patent Application No. PCT/US2014/018051, filed Feb. 24, 2014, which claims the benefit of U.S. Provisional Patent Application Ser. No. 61/768,684, filed Feb. 25, 2013, both of which are incorporated herein by reference in their entireties.

BACKGROUND OF INVENTION

Glare from lights, such as oncoming or following car headlights, can be discomforting and distracting. Existing headlights are perceived as bright point sources by oncoming drivers. Because existing car headlights use high-intensity point sources (high luminance, small area) with optics to achieve the required beam spread and light level, glare is high, especially at certain angles. This can affect comfort and task performance and can lead to a decrease in roadway safety.

Eliminating glare from lights would be very beneficial. For example, eliminating glare from headlights would allow drivers to focus on the most relevant visual information, including the path of the road, obstacles, and signage, and would result in a more comfortable and safer driving experience.

BRIEF SUMMARY

The subject invention provides novel and advantageous lighting modules and systems, as well as methods of fabricating and methods of using such lighting modules and systems. Lighting modules and systems according to embodiments of the subject invention can be high-efficiency, low-glare lighting modules. Such lighting modules and systems can be low luminance lighting modules or systems. For example, a lighting module or system can utilize a system of multiple layers of efficient optics to spread light from multiple light sources (e.g., a grid of point sources) over a larger luminous surface. The larger luminous surface can maintain the controllability, directionality, and efficiency of a single point source, while significantly reducing the glare. The surface can appear uniformly lit, or substantially uniformly lit, and no dark boundaries may be present between the individual light sources.

In an embodiment, a lighting system can include: a plurality of light sources; a first optical layer on the plurality of light sources; and a second optical layer over the first optical layer. The first optical layer can be configured to condense light from at least one light source of the plurality of light sources to a smaller beam spread. The light sources can be, for example, light emitting diodes (LEDs). The first optical layer can include, for example, a plurality of lenses. The second optical layer can include, for example, a collimating Fresnel lens.

In a further embodiment the first optical layer can be configured to condense light from all of the light sources of the plurality of light sources to a smaller beam spread. In yet a further embodiment, the beam spread can match a full area of the second optical layer.

In an embodiment, a vehicle headlight can include a lighting system as described herein. In a further embodiment, a vehicle can include a vehicle headlight including a lighting system as described herein.

DETAILED DISCLOSURE

Figure 1:
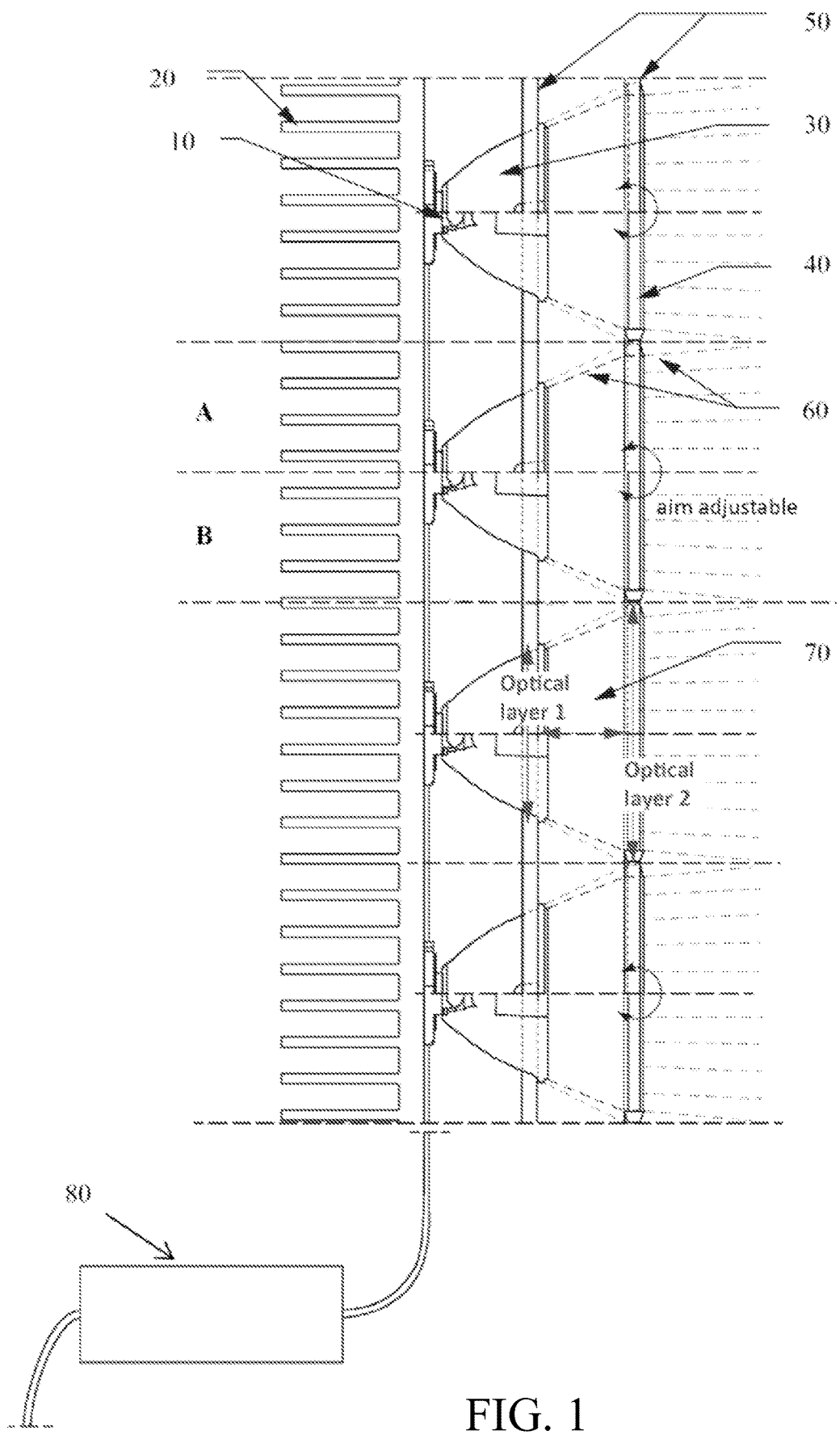
FIG. 1 shows a cross-sectional diagram of a lighting module according to an embodiment of the subject invention.

When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

When the terms "on" or "over" are used herein, when referring to layers, regions, patterns, or structures, it is understood that the layer, region, pattern, or structure can be directly on another layer or structure, or intervening layers, regions, patterns, or structures may also be present. When the terms "under" or "below" are used herein, when referring to layers, regions, patterns, or structures, it is understood that the layer, region, pattern, or structure can be directly under the other layer or structure, or intervening layers, regions, patterns, or structures may also be present.

In addition, references to "first", "second", and the like (e.g., first and second portion), as used herein, and unless otherwise specifically stated, are intended to identify a particular feature of which there may be more than one. Such reference to "first" does not imply that there must be two or more. These references are not intended to confer any order in time, structural orientation, or sidedness (e.g., left or right) with respect to a particular feature, unless explicitly stated.

The subject invention provides novel and advantageous lighting modules and systems, as well as methods of fabricating and methods of using such lighting modules and systems. Lighting modules and systems according to embodiments of the subject invention can be high-efficiency, low-glare lighting modules. Such lighting modules and systems can be low luminance lighting modules or systems. For example, a lighting module or system can utilize a system of multiple layers of efficient optics to spread light from multiple light sources (e.g., a grid of point sources) over a larger luminous surface. The larger luminous surface can maintain the controllability, directionality, and efficiency of a single point source, while significantly reducing the glare. The surface can appear uniformly lit, or substantially uniformly lit, and no dark boundaries may be present between the individual light sources.

Lighting modules and systems of the subject invention can advantageously reduce glare and increase comfort while maintaining visibility. This can be accomplished at least in part by, e.g., creating a large aperture while still maintaining the desired intensity distribution of a light source via light sources and an optical system. Increasing aperture size and decreasing luminance can sometimes be accomplished with a diffuser, but that is not a good solution in all instances because the light would be distributed equally in all directions (e.g., this would not be a good solution for headlights).

Applications for the lighting modules and systems of the subject invention include, but are not limited to, vehicle headlights and sports lighting, and event lighting. Any high-intensity fixture application where glare is an issue can benefit from the lighting modules and systems described herein.

In an embodiment, the light sources can be light emitting diodes (LEDs). LEDs can advantageously allow for easy customization of a lighting module or system according to application needs, including customizing the size, scale, and/or light level of the module or system. LED technology lends itself to use added features like customized spectra for further glare reduction and/or specific color rendering properties, as well as smart control features for modular dimming and aiming.

In an embodiment, the optical system can be a multi-lens optical system, though embodiments are not limited thereto. The optical system can include one or more layers of lenses. For example, the optical system can include two layers of lenses, though embodiments are not limited thereto. A first lens layer can include at least one total internal reflection (TIR) lens. A reflector can be used as a possible alternative to a layer of at least one TIR lens. A second lens layer can include at least one collimating lens and/or Fresnel lens. For example, a second lens layer can include at least one collimating, Fresnel lens.

FIG. 1 shows a cross-sectional diagram of a lighting module or system according to an embodiment of the subject invention. Referring to FIG. 1, in an embodiment, a lighting module or system can include a plurality of light sources 10 and an optical system. The optical system can include, for example, a first optical layer 30 and a second optical layer 40. The first optical layer 30 (also labeled "optical layer 1" in FIG. 1) can include, for example, a first lens layer having at least one TIR lens. Alternatively, the first optical layer 30 can be a reflector. The second optical layer 40 (also labeled "optical layer 2" in FIG. 1) can include, for example, at least one collimating, Fresnel lens, though embodiments are not limited thereto. The efficiency of each TIR lens and collimating, Fresnel lens present can be high (e.g., at least 85%, though embodiments are not limited thereto). A mounting (or cover) 50 can be included over (e.g., directly on) one or both of the optical layers 30, 40, though such a mounting is not necessary. The mounting 50 can be translucent, or even transparent, to minimize any remaining dark shadows or boundaries between the light sources 10. A heat sink 20 can be included adjacent to (e.g., directly under) the light sources 10, though this element is not necessary. The heat sink 20 can be made, at least in part, of any suitable heat-conducting material known in the art. Each light source 10 can be aim-adjustable, as shown in FIG. 1. The module or system can also include a driver 80 (e.g., a power conditioning electrical drive) in operable communication (e.g., wirelessly and/or via one or more wires) with the light sources 10, to supply the light sources 10 with the necessary voltage, current, and/or frequency for operation. The driver can include a control system for, e.g., dimming capabilities, feedback loop, and aiming capabilities (individual and group).

In an embodiment, the light sources 10 can all be the same type of light source. For example, each light source can be an LED. Each LED can be, e.g., a high power LED and/or can have Lambertian distribution. The Lambertian distribution can be, for example, any of the following values, at least any of the following values, at most any of the following values, or within any range having any of the following values as endpoints, though embodiments are not limited thereto (all numerical values are angles in degrees): 30, 60, 75, 90, 95, 100, 105, 110, 115, 120, 125, 130, 135, 140, 145, 150, 155, 160, 165, 170, 175, and 180. For example, the Lambertian distribution can be 120 degrees or about 120 degrees.

In an embodiment, the light sources can be LEDs, and the correlated color temperature (CCT) of each LED can be, for example, any of the following values, at least any of the following values, at most any of the following values, or within any range having any of the following values as endpoints, though embodiments are not limited thereto (all numerical values are temperatures in kelvins (K)): 1000, 1500, 2000, 2500, 2800, 2850, 2900, 3000, 3100, 3200, 3300, 3400, 3500, 3600, 3700, 3800, 3900, 4000, 4050, 4100, 4150, 4200, 4300, 4400, 4500, and 5000. For example, the CCT for each LED can be between 2850 K and 4100 K. In a particular embodiment, the CCT for each LED can be 3000 K or about 3000 K. In many embodiments, all LEDs are taken from the same batch or source.

The light sources can all be disposed on the same plane or substantially on the same plane. In an embodiment, the light sources can be mounted on a grid, such as a mounting grid. The size of the mounting grid can be determined based on the desired application. For example, a 5 cm×5 cm mounting grid can be used for a 2×4 array of 3-mm diameter light sources.

The beam angle for the first optical layer and the second optical layer can be the same or different. The beam angle for each optical layer (i.e., the first and second optical layers) can be, for example, any of the following values, at least any of the following values, at most any of the following values, or within any range having any of the following values as endpoints, though embodiments are not limited thereto (all numerical values are angles in degrees): 0, 1, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 60, 70, 80, and 90. The beam angle for each optical layer can be measured with respect to the direction the light sources are facing (i.e., the direction that is parallel to the optical layers), which is a horizontal line in FIG. 1 (i.e., the beam angles can be measured with respect to the horizontal in FIG. 1). For example, the beam angle for each optical layer can be from 10 degrees to 25 degrees. In a particular embodiment, the beam angle of the first optical layer can be from 10 degrees to 25 degrees (for a 45-degree spread), and the beam angle of the second optical layer can be 0 degrees, about 0 degrees, or close to 0 degrees to create parallel (or substantially parallel) rays that are orthogonal (or approximately orthogonal) to the first optical layer (i.e., horizontal or approximately horizontal as displayed in FIG. 1).

In an embodiment, each lens of the first optical layer can be a cone-shaped lens and can be used to condense the beam from the light source with Lambertian spread to a smaller beam spread (beam angle of first optical layer) onto the second optical layer to match the size of the lens surface. The second optical layer can include a collimating Fresnel lens for shaping the beam and distributing the light in parallel rays or close to parallel rays onto a target surface. Each lens in the first and second optical layers can be sized according to the application and/or according to the size and number of light sources.

The efficiency of the lenses in the first and second optical layers can be the same or different. The efficiency for each lens of the first and second optical layers can be for example, any of the following values, at least any of the following values, at most any of the following values, or within any range having any of the following values as endpoints, though embodiments are not limited thereto (all numerical values are percentages): 50, 55, 60, 65, 70, 75, 80, 81, 82, 83, 84, 85, 86, 87, 88, 89, 90, 91, 92, 93, 94, 95, 96, 97, 98, 99, 99.5, and 100. For example, the efficiency of each lens of the first and second optical layers can be at least 85%.

The power demand from the driver to supply the light sources can depend on final array size. For example, a headlight lamp application can have a power demand of from 20 W to 80 W or more, depending on the quantity and specification(s) of the light sources used.

FIG. 1 shows an example of beam spread 60, as well as the elevation of optics A and section through optics B. The spacing, lens area, and beam angle 70 can be optimized for the application of the lighting module or system. For example, the beam angle of the first optical layer 30 can be from 10 degrees to 25 degrees (for a 45-degree spread), and the beam angle of the second optical layer 40 can be 0 degrees, about 0 degrees, or close to 0 degrees to create parallel (or substantially parallel) rays that are orthogonal (or approximately orthogonal) to the first optical layer 30.

Intensity is defined as the luminance of a source multiplied by the area of the source. Thus, to achieve the same intensity, either the luminance or the area can be manipulated. Illuminance is defined as the luminance of the source multiplied by the area of the source divided by the square of the distance to the surface being illuminated. Therefore, to match a required illuminance level at a given distance, either the luminance of the source or the area of the source can be altered.

Lighting modules and systems according to the subject invention have lower luminance than conventional point sources and therefore produce less glare for an observer. By increasing the area of a source and decreasing its luminance (while keeping the light output constant), the sensation of glare can be decreased. The lighting modules and systems have equivalent lumen output, exhibit optimized fixture efficiency to minimize energy use, and can create an equivalent (to conventional light sources) illuminance level at a particular location in the distance, as well as a particular intensity at a specific beam angle. The beam pattern can be customized as needed. Lighting modules and systems of the subject invention can be used for headlight applications, while meeting all governmental and industry requirements where applicable.

Lighting modules and systems according to the subject invention use, instead of one high-lumen, high-intensity source, an area array of multiple light sources (e.g., LEDs), providing a total lumen output that matches a conventional point light source (e.g., a conventional headlight system). The light output can be controlled such that an observer looking towards the source will see a large—uniform, or close to uniform—luminous surface at a relatively low luminance level, instead of multiple high-intensity point sources. At the same time, the beams of the individual light sources can be collimated and controlled to efficiently direct the light onto a desired surface (e.g., the road in the case of a headlight application), where light is needed.

Lighting modules and systems of the subject invention can utilize a two-part optical lens system. The first optical layer can be include at least one lens (e.g., a cone-shaped lens; could possibly also be a reflector) to collect the light from the light sources and spread it onto the back of the second optical layer, the solid angle matching the size of the lens. The second optical layer cane include at least one lens larger than each lens of the first optical layer (or even larger than all lenses of the first optical layer combined) and can be, for example, a collimating Fresnel lens. Tilt and pan can be adjustable. The total array size can be customizable and depend on the individual design or application.

Use of distributed light sources (e.g., LEDs), as with lighting modules and systems of the subject invention, for headlight applications advantageously provides energy savings, as well as color control and dynamic brightness control of individual sections of the array panel. For example, cool-white, bluish light sources have been reported as more glaring than warm-white, yellowish sources. Also, a luminous surround reduces glare perception. If glare is reduced, a more accurate assessment of distance and speed of an approaching car can be made through enhanced spatial clues of the headlight source changing size.

In an embodiment, a headlight can include a lighting system or module as described herein.

In an embodiment, a vehicle can include a vehicle headlight including a lighting system or module as described herein.

Figure 5A:
FIG. 5A shows an image of a car with conventional headlights.
Figure 5B:
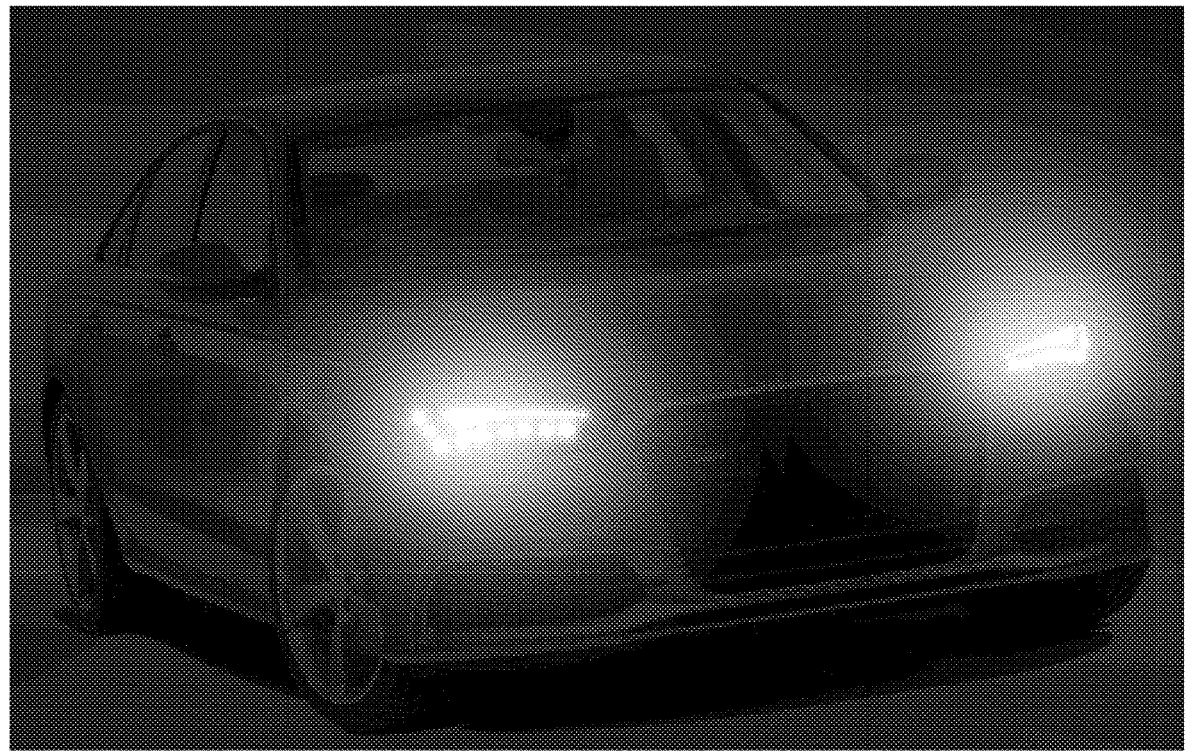
FIG. 5B shows an image of a car with illuminated conventional headlights.
Figure 6A:
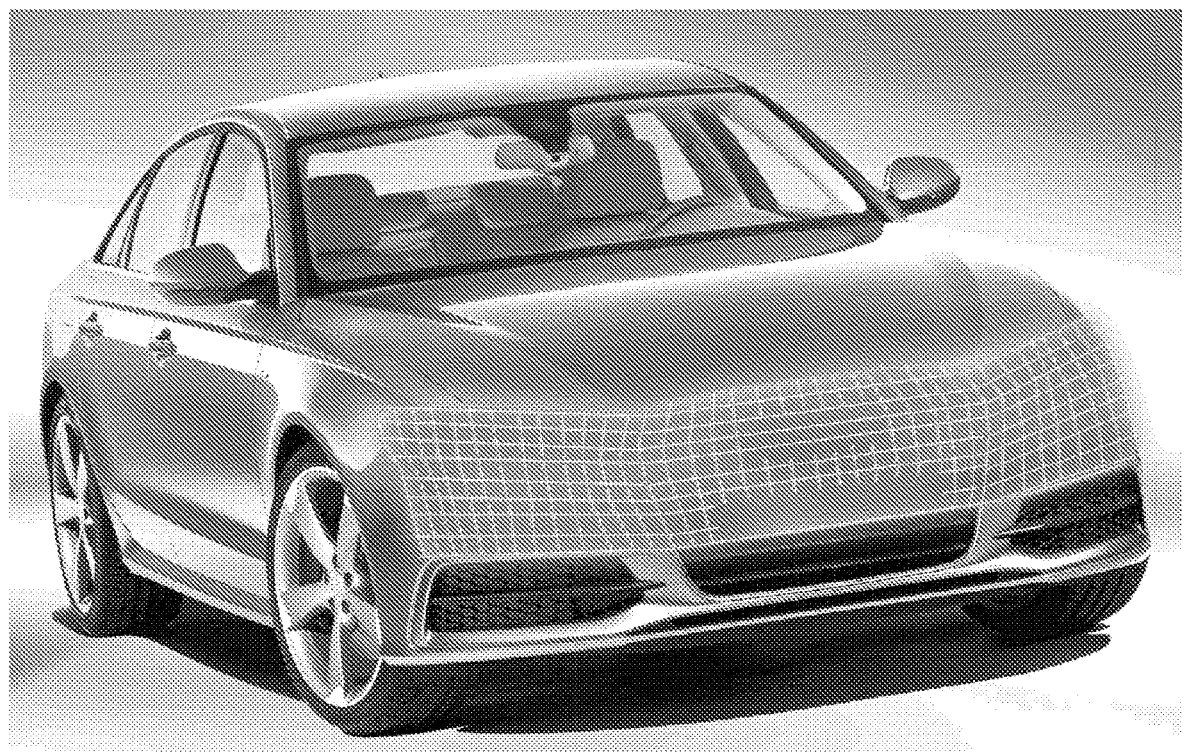
FIG. 6A shows an image of a car with headlights utilizing a lighting module according to an embodiment of the subject invention.
Figure 6B:
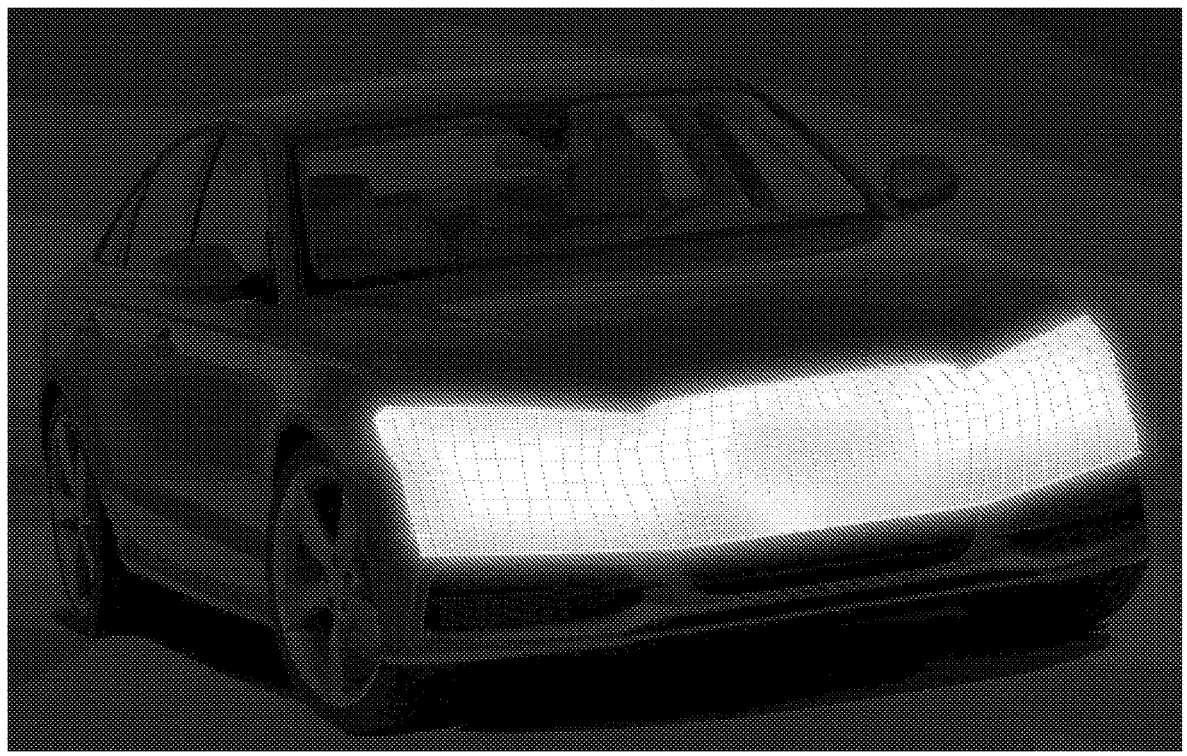
FIG. 6B shows an image of a car with illuminated headlights utilizing a lighting module according to an embodiment of the subject invention.

FIG. 5A shows an image of a car with conventional headlights, and FIG. 5B shows an image of the same car with illuminated conventional headlights. FIG. 6A shows an image of a car with headlights utilizing a lighting module according to an embodiment of the subject invention, and FIG. 6B shows an image of the same car with illuminated headlights. Referring to FIGS. 5B and 6B, the lighting module of the subject invention greatly reduces glare while maintaining the same intensity and illuminance, compared with the conventional point light sources.

Concepts of the subject invention can be used in many further applications, including any in which glare is an issue such as stadium lighting.

In an embodiment, a method of fabricating a lighting module or system can include providing the component parts of a lighting module or system as described herein and assembling them to arrive at the lighting module or system.

In an embodiment, a method of using a lighting module or system to provide light can include providing a lighting module or system as described herein and operating the lighting module or system according to its intended purpose.

Exemplified Embodiments

The invention includes, but is not limited to, the following embodiments:

Embodiment 1

A lighting system, comprising:
a plurality of light sources;
a first optical layer on the plurality of light sources; and
a second optical layer over the first optical layer,
wherein the first optical layer is configured to condense light from at least one light source of the plurality of light sources to a smaller beam spread.

Embodiment 2

The lighting system according to embodiment 1, wherein the first optical layer is configured to condense light from all of the light sources of the plurality of light sources to a smaller beam spread.

Embodiment 3

The lighting system according to embodiment 2, wherein the first optical layer is configured to condense light from all of the light sources of the plurality of light sources to a beam spread that matches a full area of the second optical layer.

Embodiment 4

The lighting system according to any of embodiments 1-3, wherein the Lambertian distribution of each light source is about 120 degrees.

Embodiment 5

The lighting system according to any of embodiments 1-4, wherein the system is configured such that each light source is aim adjustable.

Embodiment 6

The lighting system according to any of embodiments 1-5, wherein each light source of the plurality of light sources is a light emitting diode (LED).

Embodiment 7

The lighting system according to embodiment 6, wherein the correlated color temperature (CCT) for each LED is between 2850 K and 4100 K.

Embodiment 8

The lighting system according to any of embodiments 6-7, wherein the CCT for each LED is about 3000 K.

Embodiment 9

The lighting system according to any of embodiments 1-8, wherein the first optical layer comprises at least one first optical layer lens.

Embodiment 10

The lighting system according to embodiment 9, wherein the at least one first optical layer lens is a conical lens.

Embodiment 11

The lighting system according to any of embodiments 9-10, wherein the at least one first optical layer lens is a total internal reflection (TIR) lens.

Embodiment 12

The lighting system according to any of embodiments 9-11, wherein the at least one first optical layer lens has an efficiency of at least 85%.

Embodiment 13

The lighting system according to any of embodiments 1-12, wherein the first optical layer comprises a plurality of first optical layer lenses.

Embodiment 14

The lighting system according to embodiment 13, wherein each first optical layer lens of the plurality of first optical layer lenses is disposed on a light source of the plurality of light sources.

Embodiment 15

The lighting system according to embodiment 14, wherein each first optical layer lens is configured to condense light from the light source on which it is disposed to a smaller beam spread.

Embodiment 16

The lighting system according to any of embodiments 13-15, wherein each first optical layer lens has an efficiency of at least 85%.

Embodiment 17

The lighting system according to any of embodiments 1-8, wherein the first optical layer is a reflector.

Embodiment 18

The lighting system according to any of embodiments 1-17, wherein the second optical layer comprises at least one second optical layer lens.

Embodiment 19

The lighting system according to embodiment 18, wherein the at least one second optical layer lens is a collimating Fresnel lens.

Embodiment 20

The lighting system according to any of embodiments 18-19, wherein the second optical layer lens has an efficiency of at least 85%.

Embodiment 21

The lighting system according to any of embodiments 1-20, wherein a beam angle of the first optical layer is from 10 degrees to 25 degrees.

Embodiment 22

The lighting system according to any of embodiments 1-21, wherein a beam angle of the second optical layer is parallel to the first optical layer.

Embodiment 23

The lighting system according to any of embodiments 1-22, wherein a beam spread of the system is about 45 degrees.

Embodiment 24

The lighting system according to any of embodiments 1-23, further comprising a first cover on the first optical layer.

Embodiment 25

The lighting system according to embodiment 24, wherein the first cover is translucent.

Embodiment 26

The lighting system according to embodiment 24, wherein the first cover is transparent.

Embodiment 27

The lighting system according to any of embodiments 1-26, further comprising a second cover on the second optical layer.

Embodiment 28

The lighting system according to embodiment 27, wherein the second cover is translucent.

Embodiment 29

The lighting system according to embodiment 27, wherein the second cover is transparent.

Embodiment 30

The lighting system according to any of embodiments 1-27, further comprising a heat sink under the plurality of light sources.

Embodiment 31

The lighting system according to any of embodiments 1-30, further comprising a driver in operable communication with the plurality of light sources and supplying electrical current to the plurality of light sources.

Embodiment 32

The lighting system according to embodiment 31, wherein the driver comprises a control system.

Embodiment 33

The lighting system according to embodiment 32, wherein the control system is configured to dim, aim, and/or provide a feedback loop for the plurality of light sources.

Embodiment 34

The lighting system according to any of embodiments 1-33, wherein all of the light sources of the plurality of light sources are on a same plane.

Embodiment 35

The lighting system according to any of embodiments 1-34, wherein all of the light sources of the plurality of light sources are arranged in an array.

Embodiment 36

The lighting system according to any of embodiments 1-35, wherein all of the light sources of the plurality of light sources are in a grid pattern.

Embodiment 37

The lighting system according to any of embodiments 1-36, wherein all of the light sources of the plurality of light sources are mounted on a grid.

Embodiment 38

The lighting system according to any of embodiments 1-37, wherein the first optical layer is directly on the plurality of light sources (i.e., in physical contact with no intervening components).

Embodiment 39

The lighting system according to any of embodiments 1-38, wherein the second optical layer is directly over the first optical layer (i.e., no intervening components, only air).

Embodiment 40

A vehicle headlight, comprising the lighting system according to any of embodiments 1-39.

Embodiment 41

A vehicle, comprising a vehicle headlight comprising the lighting system according to any of embodiments 1-39.

Embodiment 42

A method of providing light, comprising the step of providing the lighting system according to any of embodiments 1-39.

Embodiment 43

A method of fabricating a lighting system, comprising the steps of:
providing the component parts of the lighting system according to any of embodiments 1-39; and
assembling the component parts of the lighting system.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

A lighting system according to an embodiment of the subject invention was fabricated. A cross-sectional diagram of the system is the same as that shown in FIG. 1. The light sources 10 were high-power, 3-mm diameter LEDs with Lambertian distribution (typically 120 degrees). The correlated color temperature (CCT) was 3000 K, which is within the recommended range of 2850 K and 4100 K for such LEDs. All LEDs used were from the same source. The LEDs were mounted in a grid pattern onto a heat sink 20 of heat conducting material to keep the LEDs within the operating temperature range specified by the LED manufacturer. A 5 cm×5 cm mounting grid was used.

The lens system included two optical layers 30, 40. The first optical layer 30 (also labeled "optical layer 1" in FIG. 1) included a first lens layer using highly efficient (>85%) total internal reflection (TIR) lenses. Every lens was 20 mm high with a 34-mm diameter and condensed the beam from the LED with Lambertian spread, to a smaller beam spread (45 degrees of total spread, using 10- and 22-degree beam angles) onto the second optical layer 40 (also labeled "optical layer 2" in FIG. 1) to match the size of the lens surface. The second lens (50-mm diameter) was a highly efficient (>85%) collimating Fresnel lens, shaping the beam and distributing the light in close to parallel rays onto the target surface. A mounting (or cover) 50 was provided on each of the first and second optical layers and was translucent (close to transparent) to minimize any remaining dark shadows or boundaries between the light sources 10.

The system also included a power conditioning electrical driver 80 that supplied the LED array with the voltage, current, and frequency of electricity specified by the LED manufacturer, car manufacturer, and integrator. The control system included dimming capabilities, feedback loop, and aiming capabilities (individual and group). The power demand from the driver to supply the LEDs depends on final array size and was estimated to be between 20 W and 80 W for a headlamp application, depending on the amount and specification of the LEDs used.

Example 2

Figure 3:
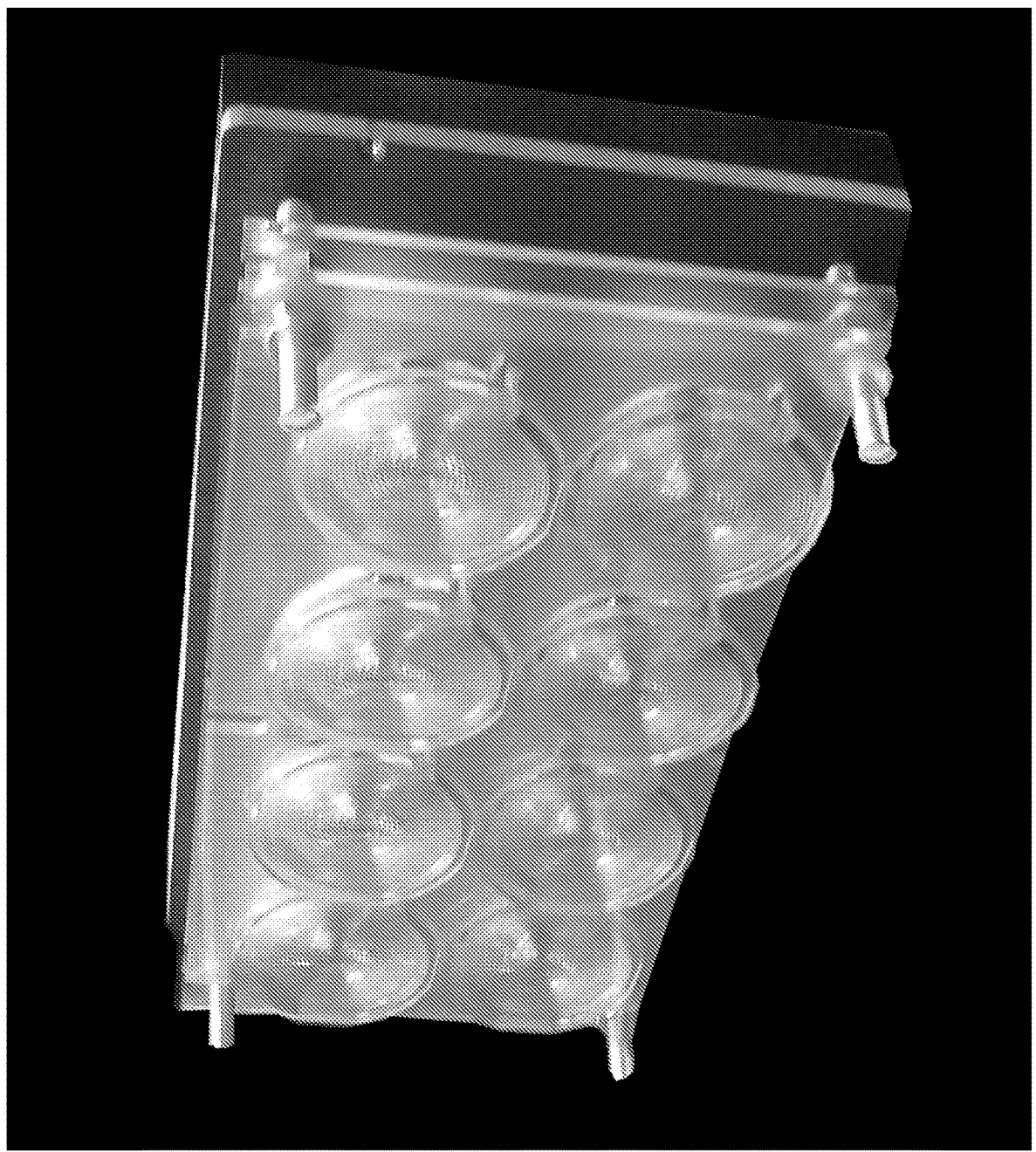
FIG. 3 shows an image of a lighting module according to an embodiment of the subject invention.
Figure 4:
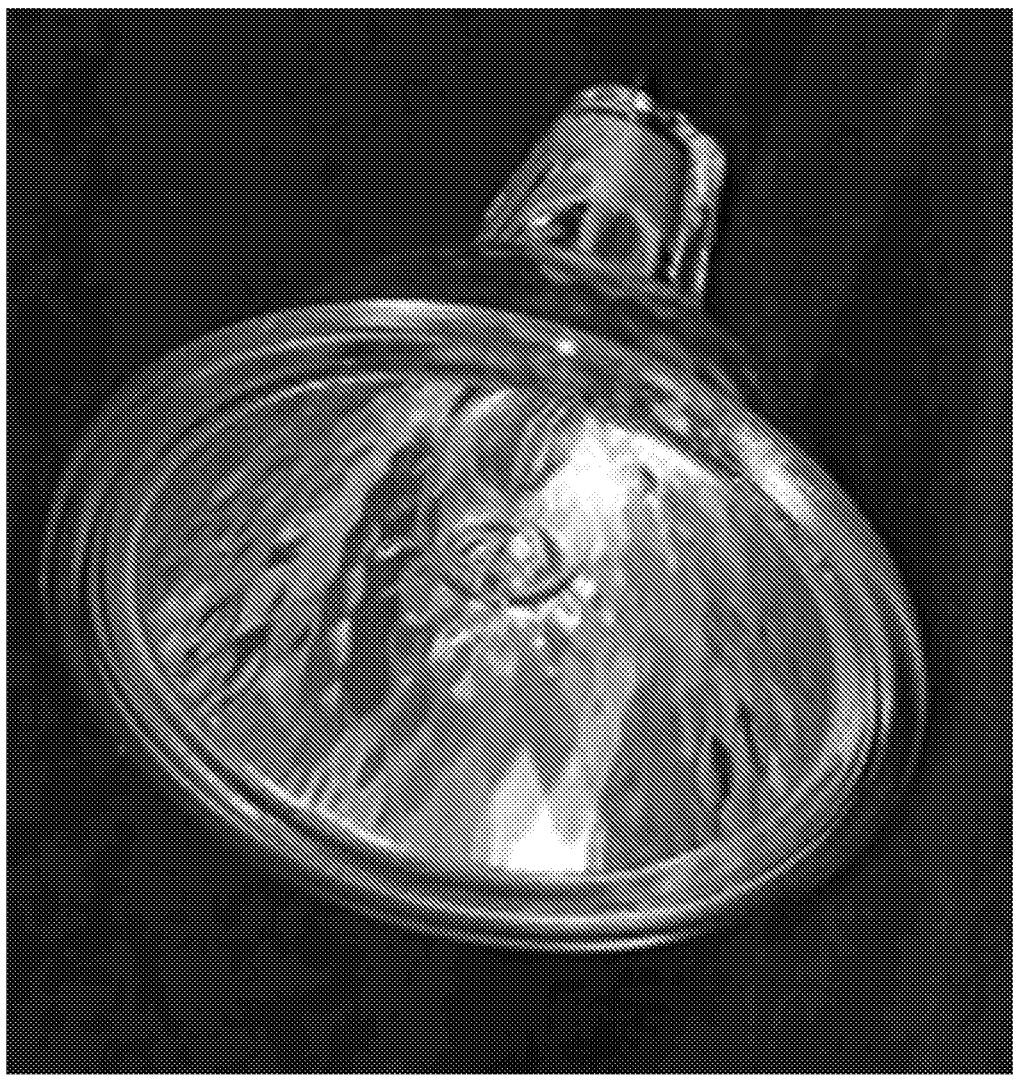
FIG. 4 shows an image of a halogen light bulb.

A lighting system was fabricated including a 2×4 LED array and the characteristics of the system of Example 1. Commercially available LEDs were used. FIG. 3 shows an image of the lighting system. This lighting system of the subject invention was compared with a conventional MR 16 halogen light bulb commonly used in headlights. FIG. 4 shows an image of this halogen light bulb. Both light sources provided the same light level (illuminance) at a certain distance. The maximum luminance for the halogen light bulb was about four times higher than that of the lighting system including the 2×4 LED array.

Figure 2:
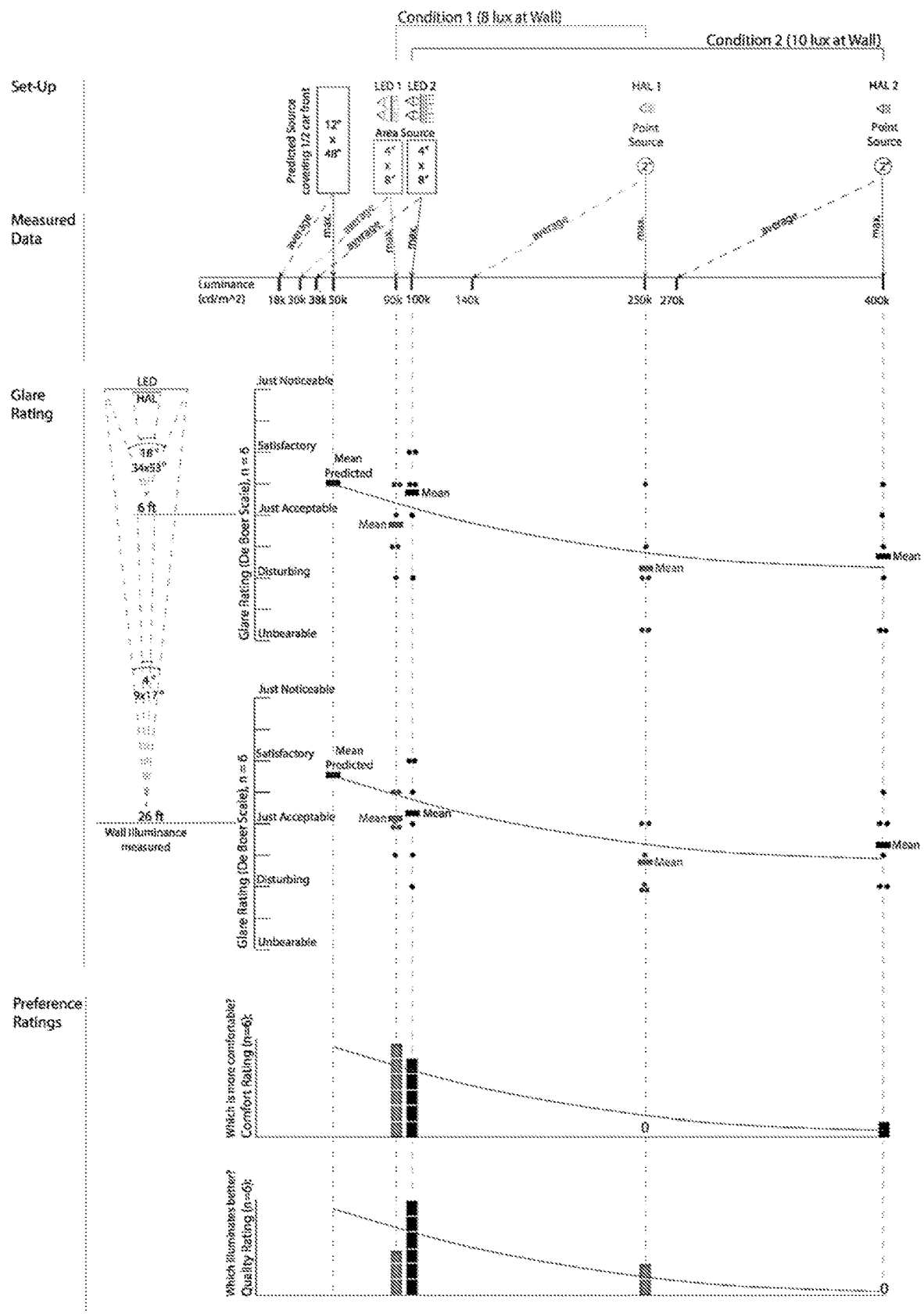
FIG. 2 shows plots of performance results of a lighting module according to an embodiment of the subject invention.

A glare study was performed, using six participants to evaluate the lighting system including the 2×4 LED array against the halogen light bulb. FIG. 2 shows plots of the results of this study. The lighting system including the 2×4 LED array was evaluated as having less glare and being more comfortable to look at than the halogen light bulb by all six participants. In fact, the glare was greatly reduced from "disturbing" to "acceptable" from the halogen light bulb to the lighting system including the 2×4 LED array. Equivalent light levels and beam spreads were maintained. For this proof-of-concept (POC) prototype commercially available lenses were used. The quality of illumination and the quality of light distribution from the lighting system including the 2×4 LED array were generally preferred over those of the halogen light bulb. Visual performance did not differ depending on the source.

Example 3

Conventional headlights range in design and light output, but they mainly use halogen or HID sources between 35-65 watts per lamp and a lumen output between 800-3500 lumens (lms). A typical conventional headlight system (55-W halogen) has a luminous flux of 3000 lms (1500 lamp lumens×2 headlights). However, application efficiency is lower (only about 40%). The optics of conventional headlights comply with required beam patterns. In the United States, at particular beam angles, 15,000 candelas (cd) of intensity are required. Viewing the headlamp directly at that angle, this would correspond to a luminance of approximately 882,000 cd/m$^2$ per headlight (for a typical diameter of 146 mm). The aiming recommended avoids direct view, and only few angles require this high intensity, however improper aiming is easily possible and appears to happen frequently; inspections are not enforced.

The exact area size of a low-luminance luminaire (or lighting module or system) according to an embodiment of the subject specification can depend on the application and can be customized to maximize benefits, as can the exact number and specification (e.g., efficacy, wattage, and/or spectrum) of the light sources (e.g., LEDs) used.

As an example: using 1-watt LEDs at an efficacy of 85 lm/W, the lighting module could achieve the same flux of 3000 lms using an array of 36 LEDs. With dedicated optics per LED, the application efficiency is likely to be better than for a conventional headlamp; it is estimated at approximately 70%. This provides the potential of additional energy savings. To achieve the required intensity of 15,000 cd with half of the LEDs (for example, 18 LEDs producing a source area of 0.18 m$^2$), the luminance could be decreased 10 times to 84,000 cd/m$^2$ (at direct view). Increasing the number of LEDs and surface area even more could potentially lower it further. This example illustrates that the low luminance luminaire has the ability to reduce glare significantly compared to a conventional headlight.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

We claim:

1. A lighting system, comprising:
   a plurality of light sources emitting light in a first direction;
   a first optical layer on the plurality of light sources, the first optical layer redirecting a portion of the light emitted from the light sources into a second direction, the second direction canted a first beam angle relative to the first direction;
   a second optical layer over the first optical layer, the second optical layer redirecting a portion of the light received by the second optical area into a beam spread in a third direction forming a uniform luminous surface, the third direction canted a second beam angle relative to the first direction and the luminous surface matches a full area of the second optical layer; and a driver connected to the plurality of light sources, the driver controls at least one of the voltage, current, and frequency of the plurality of light sources to generate a light emission pattern;

wherein the first optical layer is configured to condense light from at least one light source of the plurality of light sources to a smaller beam spread, wherein the first optical layer comprises a first optical layer lens in direct physical contact with a light source of the plurality of light sources, wherein the first optical layer is disposed between second optical layer and the plurality of light sources, and wherein the light emission pattern establishes at least one of a dimming capability, a feedback loop, and an aiming capability of at least one of the plurality of light sources.

2. The lighting system according to claim 1, wherein the first optical layer is configured to condense light from all of the light sources of the plurality of light sources to a smaller beam spread.

3. The lighting system according to claim 1, wherein the Lambertian distribution of each light source is about 120 degrees.

4. The lighting system according to claim 1, wherein the aiming capability allows at least one of the plurality of light sources to redirect light emitted from the light source to change the light emission pattern.

5. The lighting system according to claim 1, wherein each light source of the plurality of light sources is a light emitting diode (LED).

6. The lighting system according to claim 5, wherein the correlated color temperature (CCT) for each LED is between 1000 K and 5000 K.

7. The lighting system according to claim 1, wherein the first optical layer lens is a total internal reflection (TIR) lens, and wherein the TIR lens has an efficiency of at least 85%.

8. The lighting system according to claim 1, wherein the first optical layer comprises a plurality of first optical layer lenses, wherein each first optical layer lens of the plurality of first optical layer lenses is disposed on, and direct physical contact with, a light source of the plurality of light sources, respectively, and wherein each first optical layer lens is configured to condense light from the light source on which it is disposed to a smaller beam spread.

9. The lighting system according to claim 1, wherein the second optical layer comprises at least one second optical layer lens, wherein the at least one second optical layer lens is a collimating Fresnel lens, and wherein the at least one second optical layer lens has an efficiency of at least 85%.

10. The lighting system according to claim 1, wherein the first beam angle is from 10 degrees to 25 degrees.

11. The lighting system according to claim 1, wherein a the second beam angle is 0 degrees.

12. The lighting system according to claim 1, wherein a beam spread of the system is about 45 degrees.

13. The lighting system according to claim 1, further comprising a first cover on the first optical layer and a second cover on the second optical layer, wherein the first cover is translucent or transparent, and wherein the second cover is translucent or transparent.

14. The lighting system according to claim 1, further comprising a heat sink under the plurality of light sources.

15. The lighting system according to claim 1, further comprising a driver in operable communication with the plurality of light sources and supplying electrical current to the plurality of light sources, wherein the driver comprises a control system, and wherein the control system is configured to dim, aim, and provide a feedback loop for the plurality of light sources.

16. The lighting system according to claim 1, wherein all of the light sources of the plurality of light sources are on a same plane, and wherein all of the light sources of the plurality of light sources are arranged in an array.

17. The lighting system according to claim 1, wherein the first optical layer comprises a plurality of first optical layer lenses, wherein each first optical layer lens of the plurality of first optical layer lenses is disposed on, and direct physical contact with, a light source of the plurality of light sources, respectively, and wherein the second optical layer is directly over the first optical layer.

18. The lighting system according to claim 1, wherein the magnitude of the first beam angle is substantially the same as the magnitude of the second beam angle.

* * * * *